(12) United States Patent
Krilivsky

(10) Patent No.: US 10,261,726 B2
(45) Date of Patent: Apr. 16, 2019

(54) PRINTED IMAGE PRODUCED BY THE TRANSFER OF A MOBILE DEVICE CAMERA IMAGE TO AN IMAGE-SUPPORTING SURFACE

(71) Applicant: RageOn, Inc., Cleveland, OH (US)

(72) Inventor: Michael Krilivsky, San Francisco, CA (US)

(73) Assignee: RageOn, Inc., Cleveland, OH (US)

( * ) Notice: Subject to any disclaimer, the term of this patent is extended or adjusted under 35 U.S.C. 154(b) by 0 days.

(21) Appl. No.: 15/966,305

(22) Filed: Apr. 30, 2018

(65) Prior Publication Data

US 2018/0246680 A1    Aug. 30, 2018

Related U.S. Application Data

(63) Continuation of application No. 15/308,273, filed as application No. PCT/US2015/028292 on Apr. 29, 2015, now Pat. No. 9,959,080.

(Continued)

(51) Int. Cl.
| | |
|---|---|
| *G06F 3/0482* | (2013.01) |
| *G06F 3/12* | (2006.01) |
| *G06Q 30/06* | (2012.01) |
| *B41J 29/38* | (2006.01) |
| *G06F 3/0481* | (2013.01) |
| *G06F 3/0484* | (2013.01) |
| *G06F 3/0485* | (2013.01) |
| *H04N 5/232* | (2006.01) |

(52) U.S. Cl.
CPC ............... *G06F 3/12* (2013.01); *B41J 29/38* (2013.01); *G06F 3/0482* (2013.01); *G06F 3/0485* (2013.01); *G06F 3/04817* (2013.01); *G06F 3/04845* (2013.01); *G06Q 30/0621* (2013.01); *H04N 5/23216* (2013.01); *H04N 5/23293* (2013.01)

(58) Field of Classification Search
CPC ............... G06F 3/04817; G06F 3/0482; G06F 3/04845; G06F 3/0485; G06F 3/12; G06G 30/0621; H04N 5/23216; H04N 2/3293; H04N 1/00167; H04N 1/00456; H04N 1/001; G06Q 30/0621; G06Q 30/0635; G06Q 30/0643
See application file for complete search history.

(56) References Cited

U.S. PATENT DOCUMENTS 7,660,750 B1    2/2010    Goodson et al.
8,660,366 B2    2/2014    Chen et al.
(Continued)

*Primary Examiner* — Huan H Tran

(74) *Attorney, Agent, or Firm* — Walter | Haverfield LLP; D. Peter Hochberg; Sean F. Mellino

(57) ABSTRACT

A print of an image of a subject on an image-supporting surface made with the mobile device camera on a product having the image-supporting surface therein, the print having been made with a mobile device camera having an imaging app with a finger actuable editing touchscreen, the finger actuable editing touchscreen enabling the simultaneous display of one of a series of transparencies of products, the image-supporting surfaces with subjects viewed through the camera viewfinder to provide mock-ups in real time of products with the subjects viewed by the user of the camera superimposed in the products in preparation for the printing thereof.

9 Claims, 16 Drawing Sheets

Related U.S. Application Data

(60) Provisional application No. 61/987,242, filed on May 1, 2014.

(56) References Cited

U.S. PATENT DOCUMENTS

| | | |
|---|---|---|
| 8,688,764 B2 | 4/2014 | Chauvin et al. |
| 9,959,080 B2 * | 5/2018 | Krilivsky ................. G06F 3/12 |
| 2004/0267637 A1 | 12/2004 | Sato et al. |
| 2007/0156837 A1 | 7/2007 | Elgar et al. |
| 2007/0226653 A1 | 9/2007 | Moore et al. |
| 2007/0265935 A1 | 11/2007 | Woycik et al. |
| 2009/0034012 A1 | 2/2009 | Northup et al. |
| 2011/0059728 A1 | 3/2011 | Poisson |
| 2011/0106649 A1 | 5/2011 | Tagliabue |
| 2012/0109777 A1 | 5/2012 | Lipsitz et al. |
| 2012/0179571 A1 | 7/2012 | Grosso, III |
| 2013/0054406 A1 | 2/2013 | Ritts |
| 2013/0091029 A1 | 4/2013 | George et al. |
| 2013/0262261 A1 | 10/2013 | Rozek et al. |
| 2013/0304604 A1 | 11/2013 | Hoffman et al. |
| 2014/0040065 A1 | 2/2014 | DuBois |
| 2014/0095342 A1 | 4/2014 | Gowen et al. |
| 2014/0101152 A1 | 4/2014 | Chen et al. |
| 2014/0108188 A1 | 4/2014 | Comstock et al. |
| 2014/0114793 A1 | 4/2014 | Silver |

* cited by examiner

PRINTED IMAGE PRODUCED BY THE TRANSFER OF A MOBILE DEVICE CAMERA IMAGE TO AN IMAGE-SUPPORTING SURFACE

CROSS-REFERENCE TO RELATED APPLICATION

This application is a continuation of U.S. patent application Ser. No. 15/308,273 filed Nov. 1, 2016, which is the U.S. National Phase of PCT/US2015/028292 filed Apr. 29, 2015 which claims priority to U.S. Provisional Application No. 61/987,242 filed May 1, 2014, all of which are incorporated herein by reference in their entireties.

BACKGROUND OF THE INVENTION

Field of the Invention

This invention relates to a print of an image on an image-supporting surface, more particularly to the print of an image produced by a mobile device camera on a transparent overlay image of an image-supporting surface such as a garment, a flexible household product, a hard surface or an industrial product in real time as a mock-up, and in particular to a print of an image on an actual image-supporting surface, or to a print resulting from the sharing of the image produced by a mobile device camera on a transparent image of an image-supporting surface on a unique newsfeed in real time as a mock-up.

Description of the Prior Art

Systems and processes are known for the printing of images produced on a mobile device camera and thereafter printed on a or other personal or household item. The systems and processes that are known all have shortcomings.

In one company called #YoShirt, the user loads an application ("an app") on the user's mobile device, and then goes to a startup screen. Next, the user must tap the startup screen and will be presented with a T-shirt mockup screen. The only way to select a different garment style, is for the user to tap a small garment icon, then browse through different garment options, select one by tapping, and then the user goes back to the screen where the user can proceed to selecting an effect or selecting an image. The user then selects one of a series of image-producing variables from the app, which variables include a selection of a photo taken by the mobile device camera or a preselected design for the shirt. The user may change the size of the image against a basic background. The user actuates the app to display the image on the selected shirt and views the same. Thereafter, the user goes back to the original app, selects a "BUY" icon, enters information regarding the user's identity, shipping address and size, and actuates the app to select the mode of payment. The app of #YoShirt has a series of problems. A user is unable to view a teal-time image on a mock-up image of a selected shirt; only a taken-photo appears on the image of the shirt. Also, it takes nine steps in order to buy a garment with a selected image on it. Furthermore, it takes about 33 seconds to take the photo and make the purchase. In order to choose a stored photo image and make a purchase, it takes 30 seconds. The #YoShirt uses a large number of screens and requires the use of a home screen. Furthermore, the #YoShirt system does not enable the use of filters.

Another organization is called SeeMe. In order to use the SeeMe system, one must actuate the SeeMe app. According to the SeeMe app, one must take a photo with the mobile device or use a stored image on the viewfinder window. In either case, it takes about 180 seconds to take the photo and show the photo on a garment in the viewfinder window. The SeeMe app cannot be used to view the photo image in real time as a mock-up. Furthermore, the user must go through a series of screens to select the garment, to select the image, to select the size, to enter the shipping address and enter the payment information. In fact, it takes at least 19 steps in order to buy the garment with the selected image. The app itself produces an unclear image, and it is difficult to use filters with the app. Finally, the SeeMe app does not allow for the storing of billing information, shipping information, credit card information and the like.

Another organization is called Doobie. The Doobic app has serious shortcomings with respect to the present invention as described below. It takes nine or more screens in order to buy a garment. The app involves selecting one of a series of garments, selecting an image which can be done by way of Instagram, or a stored photo, or taking a photo on a mobile device. The mobile device hag been found to be inadequate. Importantly, the user is unable to view the subject matter of the image in real time on a mock-up of the selected garment. In order to select a stored image and make a purchase, it has been found to take at least 180 seconds to make the selection. Also, the app is currently defunct that a user cannot take a photo and then make a purchase. Furthermore, there is no way to use filters. Finally, a user of the Double app is unable to store billing information, shipping information, or to use a credit card. The Doobie app has been found to be difficult to use and lengthy to go through the entire selection and ordering procedure.

Another organization refers to itself as Snaptee. This organization uses a Snaptee app. A shortcoming of the Snaptee app is that it takes over 180 seconds in order to take a photo and purchase using the mobile device, and it takes the same amount of time to select the stored photo and purchase. Like the other apps discussed herein that are known in the prior art, the user cannot review the subject matter in real time as a mock-up. It has many screens, it does not enable the easy use of filters, and it does not store information related to billing, shipping or credit cards. Snaptee also does not do all-over-print (such as by dye sublimation) shirts. They mainly produce "Direct to Garment" shirts, which is a completely separate technology, manufacturing process, and end product output from the present invention described below.

Another system is known from U.S. 2011/0106649 (Tagliabue, Pub. May 5, 2011), which discloses a method and a system for ordering and producing a customized garment. The mobile device has an app which enables the user to select one of a series of stored images or to use the mobile device to take a photo. The user can allegedly then view on the viewfinder window the image taken by the camera and position it on the garment. The user can position in sequence a number of images on the garment and actuate the app to purchase the selected garment with the selected image thereon. There is no real-time mock-up of an image on the garment. The user can store the order on a server for eventual downloading for processing by an automated dye-sublimation printing machine to print the selected image on the garment. There is also no mention of speed or a streamlined system to do what the SnapShirt app can do.

There are no known systems or processes for producing an image to be placed on an image-supporting surface, such as a garment or other flexible product, a product having a solid surface, such as dishware or any other household, personal or recreational product, or an industrial product, in real time to produce a mock-up of the final product with the image thereon, and upon the satisfaction of the user of the system to make the final selection of a desired product wherein the selected image is printed in the preselected size and location on the product.

There are also no known systems for creating images on a newsfeed, overlaying the created newsfeed image on changeable transparent images of products with image-supporting surfaces, and initiate the printing of the created newsfeed image on the selected product.

SUMMARY OF THE INVENTION

It is an object of the present invention to provide the print of an image resulting from a camera image on a mobile device viewfinder of an image of a subject viewed by a mobile device camera superimposed on an image of a product with an image-supporting surface, and the print of an image resulting from a real-time mock-up with the image of the subject disposed on a transparency of the image on the supporting surface.

It is also an object of the present invention to provide a print resulting from a method for a user to prepare in real time a mock-up on a mobile device viewfinder, a variable camera image on an image-supporting surface, the making of a final selection of the image and the image-supporting surface, and effect the production of the print of image-supporting surface with the finally selected image located thereon.

Another object of the invention is to provide a print of an image in the viewfinder of a mobile device containing the simultaneous view of a transparent overlay of a product and an image taken from either a subject being viewed in real time by the mobile device or a subject on a stored previously captured photo viewed in the mobile device viewfinder and superimposed on the transparent overlay, where the size and location of the image on a selected product has been varied, and the final selection of the image of the subject on the transparent overlay of a selected product has been made, the print being of an image of the selected product with the selected image located thereon.

It is yet another object of the present invention to provide a print produced by a system and a method for use with a mobile device having a viewfinder with an app actuable for placing transparent images of subjects viewable on a viewfinder of a mobile device, on transparent images of image-supporting surfaces on the viewfinder, and thereafter placing images from currently captured pictures and/or stored pictures on the image-supporting surface, varying characteristics of the image and the size and location of the image on the image-supporting surface, and enabling the final selection of the image-supporting surface and the image in an easy and expeditiously-useful system, the print be that of the final selection.

Yet a further object of the present invention is to provide a printed image produced by a system and a method for a user to prepare in real time a mock-up on a mobile device viewfinder of a changeable image of a subject viewed through the viewfinder superimposed on an image of a product with an image-supporting surface, with both the image of the subject and the image of the product with the image-supporting surface being changeable, preliminarily selecting the image of the subject and the image of the product with the image-supporting surface, using one's fingers to change the size and location of the image of the subject on the image of the product with the image-supporting surface with the selected image of the subject positioned thereon, making a final selection of the image of the subject and the product with the image-supporting surface and effecting the production of the inventive printed image with the selected product with image-supporting surface and the selected image of the subject printed thereon.

It is also an object of the present invention to provide a print of a selected camera image on a selected product resulting from the provision of a system and a method involving the creation of camera images, the sharing the created images on a unique newsfeed, overlaying the created camera image on one of a series of changeable transparencies of a variety of products, which can be shared with followers of the user's unique newsfeed, and initiate the printing of the selected created camera image on the selected product.

These and other objects will be apparent from the description to follow and from the appended claims.

DETAILED DESCRIPTION OF THE INVENTION

Figure 1:
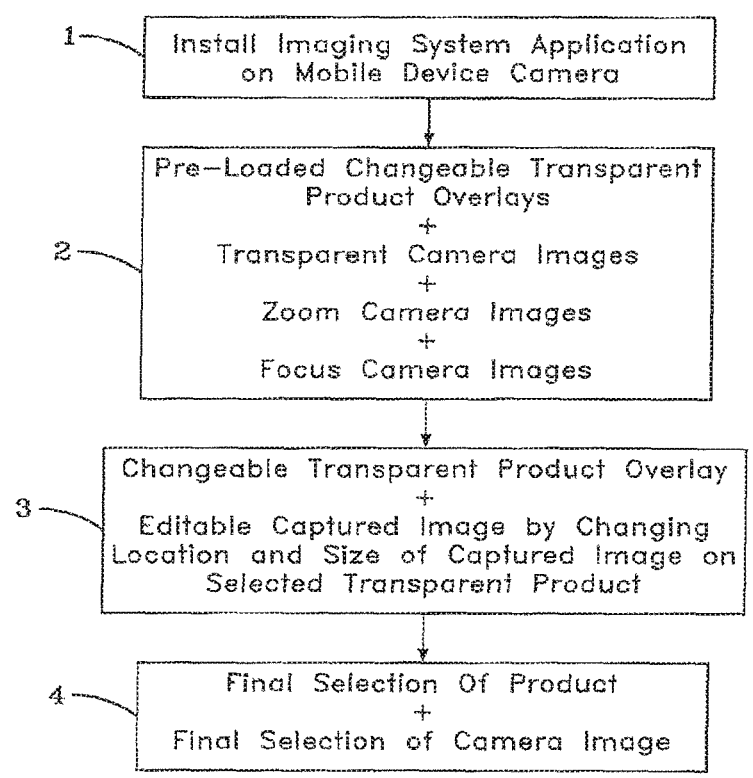
FIG. 1 is a flow diagram showing the method of making an image to be printed on an image-supporting surface.

In the discussion to follow, the following terms and their definitions will be used. The term "real time" means the actual time during which something takes place, i.e. as it comes in.

The term "mobile device camera" means a camera as used in a smartphone, tablet, or an independent camera of the type used in a smartphone, tablet, or similar device.

The term "app" means an application, typically a small, self-contained specialized program downloaded into a mobile device.

The term "image-supporting surface" means the surface of a product upon which an image may be or is printed thereon. The term "image-supporting surface" also means a product with an image-supporting surface.

The term "subject" means something of which a viewfinder can capture a picture.

The term "previously captured picture" means a picture previously taken by a mobile device camera or picture saved to a mobile device and stored in the mobile device memory.

The term "viewfinder Window" means a display used on a mobile device for displaying either or both of a subject of which the mobile device camera can take a picture, can display a different image, can display different information and/or can display different icons.

The term "superimposed images" as used herein means an image of a product with an image-supporting surface and an image of a camera subject or other feature superimposed thereon.

The term "mock-up" means a prototype, are image of a product with a camera image superimposed thereon, the superimposed image being of varying sizes and having the appearance of the product as it would appear if the product with the camera image printed thereon were brought to fruition.

The term "view" as used with respect to the mobile device camera means the subject transmitted by the camera lens to the viewfinder, and of which a photo can be made.

The term "camera image" means an image of a subject viewed by a mobile device camera lens and transmitted to the viewfinder window of a mobile device camera.

The term"photo" means a picture made with a mobile device camera, but the picture can be temporary and need not be permanent.

The term "touchscreen" refers to an electronic visual display that a user can control through simple or multi-touch gestures by touching the screen with one or more fingers or by using a stylus. Touchscreens are commonly used on mobile devices.

The term "finger touch" means controlling on a touchscreen interface of a mobile device camera viewfinder, with one or more of a user's fingers, variable aspects of the mobile device camera such as zooming, focusing, previewing images, accessing previously stored photos and picture taking.

The term "manual" means accomplishing a function by use of one's hands or one's finger or fingers.

The term "social media" means forms of electronic communication (as Web sites for social networking and microblogging) through which users create online communities to share information, ideas, personal messages, and other content.

The term "newsfeed" is a data format used for providing users with frequently updated content. For example, the Facebook® or Instagram® Newsfeed are well known types of newsfeeds.

The term "profiles" refers to a description provided by users of social media to give other users of the respective social media such material as a picture of the user, members of the respective social media befriended by the user (such as followers, and who is following the user), contents (i.e. user's design creations overlayed on products, and other's design creations overlayed on products), personal information (birthday, work history, education and interests), professional information.

The term "transparent" means an image through which light or another image can be distinctly seen therethrough, which includes semi-transparent.

The term "swipe" means moving one's finger or fingers across a touchscreen to display different transparencies, viewfinder windows, or mock-ups.

The term "drag" means using one's finger to "grab" an image at one location on a screen on the viewfinder window and moving the image to another location on the screen, and lifting the finger to drop the image at the new location.

The system and the method according to a preferred embodiment of the invention involves the use of a mobile device camera, including the use of the viewfinder of the mobile device camera, to present a variable transparent overlay of a product with an image-supporting surface and a transparent image of a subject, the latter being constantly changeable as the camera viewfinder views constantly changes subjects. The user can finger touch the viewfinder screen to change the product with the image-supporting surface amongst a series of products With image-supporting surfaces stored in the mobile device, and can simultaneously change the subject by changing the view of the mobile device, the subject being superimposed on the transparent image of the product with image-supporting surface. The camera image as disposed on a transparent overlay of an image-supporting surface extends beyond the image-supporting surface and is seen in real time. The user can also zoom in or zoom out the subject by means of a touchscreen interface on the viewfinder window. By means of the camera touchscreen feature, the user can, by means of contacting the viewfinder window by finger touch, access such controls as focusing, zooming, picture taking and previewing images. The user can also tilt the subject viewed on the viewfinder window, such as by tilting the mobile device. The user can take a picture by actuating the finger-actuable device to make a photo which is superimposed on the previously-selected image-supporting surface. The user can continue to vary the products with the respective image-supporting surface by reviewing in sequence the series of products with stored image-supporting surfaces shown as transparent overlays, and can also change the size, orientation and location of the image of which the picture was taken. An optional feature of the preferred embodiment includes the use of a variety of filters which are digitally accessible to change such items of the picture superimposed on a selected product with an image-supporting surface. These filters can include such items as black and white (as opposed to color), a bronze tint, an antique tint, a blur to the image of the subject, a "frosty" modification of the image of the subject, with other fitters being available. The user is able to see an image of any of a series of image-supporting surfaces with a photo of the subject imposed thereon as a mock-up in real time. There are many variations and additions to the foregoing system and features, which are discussed below.

Another unique but optional feature of the present invention is the creation of images for a unique newsfeed which is part of the inventive imaging app according to a preferred from of the invention. The user can make a camera image of a subject, share the image of the subject on a unique newsfeed which is part of the inventive imaging app, overlay the camera image on a series of changeable image overlays of products with image-supporting surfaces, and initiate the printing of the camera image on a selected image of a product. The latter image of a selected product on the selected product is sharable with followers of the user's unique newsfeed. The user also has access to the unique newsfeeds of other users of the unique newsfeed that the user has followed, and can change the image overlays of the types of products on which the camera subject is superimposed of the followed newsfeed.

A flow diagram for the preferred method according to the invention is shown in FIG. 1. The viewfinder window has a touchscreen.

The inventive method begins with the installation of an image-processing app in the mobile device. Thereafter, the mobile device-imaging app ("app") can be used repeatedly by installation on a mobile device. Following the installation of the app on the mobile device, the user starts the process by touching an appropriate icon on the viewfinder window. This initiates the program. The user can view on the viewfinder window a constantly changeable camera image. This is done simultaneously with an overlay transparency of a product with an image-supporting surface. The user can change the subject viewed by the mobile device by moving the camera and can likewise change the product with the image-supporting surface by touching the viewfinder window at one or more appropriate positions, such as by swiping the location of the image-supporting surfaces.

When the user finds what is considered to be an acceptable camera image, the user ouches a picture-taking icon (i.e. a shutter release) to display on the viewfinder window the picture taken located on the previously-selected product with the image-supporting surface. The user can continue to change the product with the image-supporting surface by touching the appropriate icon, which in the preferred embodiment is done by the foregoing swiping action. The camera image remains on the image of whatever image-supporting surface is shown in the viewfinder window. This is a mock-up in real time of product with the image-supporting surface with the image located thereon. The user can touch the viewfinder window to zoom the image displayed on the image-supporting surface and to move the picture taken anywhere desired on the visible portion of the image-supporting surface. When a final selection is made of the camera image and the image-supporting surface, the user touches a completion icon (such as a "buy" icon) to complete the process.

FIG. 1 is a flow diagram showing the basic Steps for the preferred embodiment of the present invention. Box 1, labeled "Install Imaging System Application on Mobile Device Camera," shows the installation of an imaging app on a mobile device camera of the system for eventually preparing a mock-up displayed on the viewfinder window of the mobile device camera of a finally-selected product with a finally-selected image to be printed thereon. Box 2 shows a "Pre-Loaded, Changeable Transparent Product Overlays" plus "Transparent Camera Images" of a product disposed over and including one of the transparent product images (i.e. a transparent image-supporting surface), all of which are displayed on the camera viewfinder window. The user can change or swipe the transparent product overlays to see the series of selectable products. The viewfinder also displays transparent camera images superimposed on the respective transparent product overlays to display possible products with the images located thereon. The user can use one's fingers to zoom the camera images to make the images larger or smaller, can rotate the image, and can tap the viewfinder window screen to focus on the tapped area of the image.

The user car continue to swipe the product overlays to see any product shown in the series of products which were preloaded on the camera viewfinder. Once the user has found a possible camera image, the user touches an icon (i.e. a shutter release button) on the presently-displayed images on the first-touched camera screen and yields a second camera touchscreen on which are displayed a "Changeable Transparent Camera Overlay" with the captured "Camera Image" superimposed on the product overlays. This step is shown in Box 3. The captured camera image is confined to the product overlay and does not overlap. The user can, by finger manipulation on the second-displayed touchscreen, move the captured image on the transparent product overlay and change, by finger manipulation, the size of the captured image, the location of the captured image, and rotate the captured image on the selected transparent product overlay. The user can continue to change the transparent product overlay by using a swiping motion with the user's finger. When the user has chosen a transparent product overlay and a captured image of the desired size and location of the captured image on the product overlay, the user can touch an icon on the second touchscreen viewed on the camera to display an image of the final selection of the product with the finally-selected camera image disposed at the selected location thereon. A third touchscreen appears on the viewfinder window indicated in Box 4 with a high-fidelity mock-up of the "Final Selection of Product," with the "Final Selection of Camera Image," which is stored for the ultimate effecting of subsequent steps for having the product with the selected captured image printed thereon.

Figure 2:
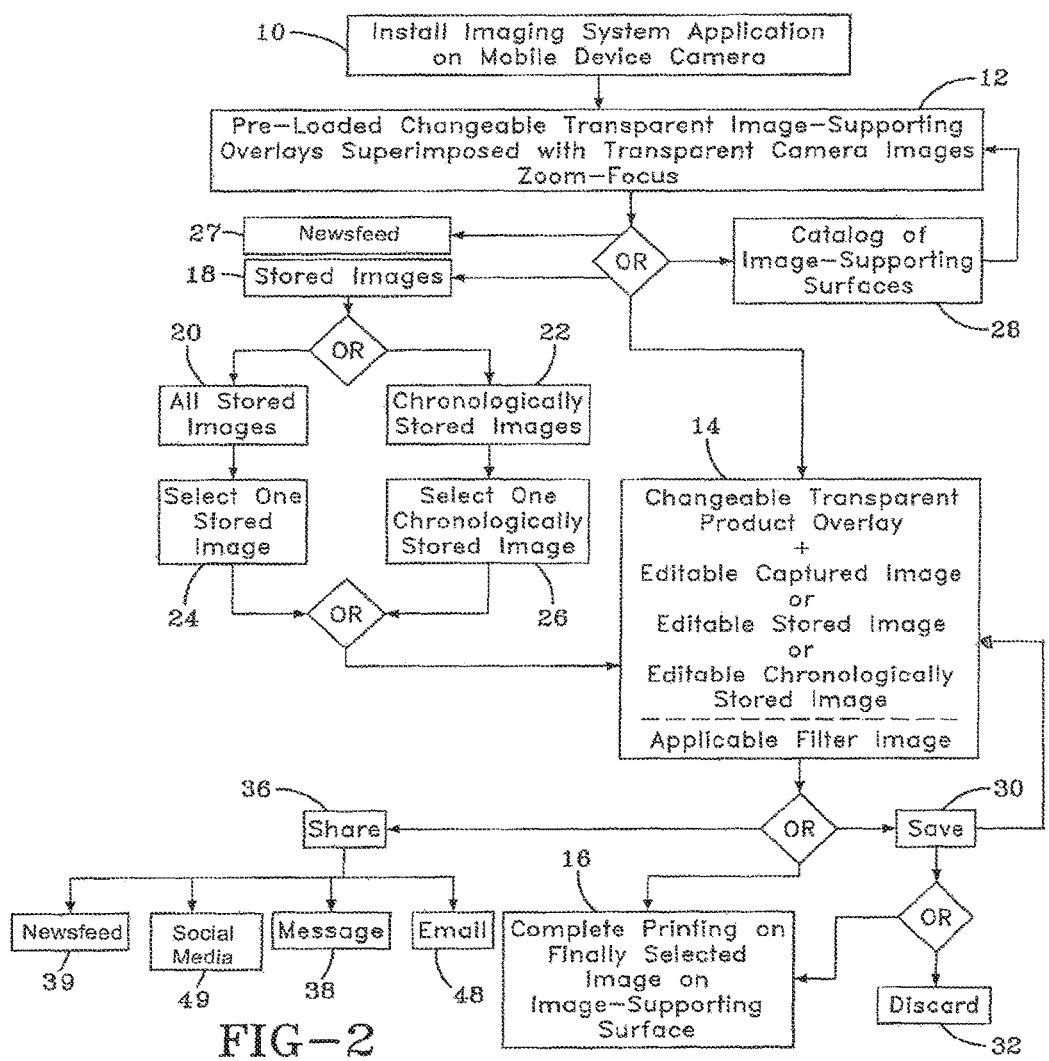
FIG. 2 is a modification of the flow diagram shown in FIG. 1.

Referring to FIG. 2, which is a modification and expansion of the basic flow diagram shown in FIG. 1, a subsequent flow diagram is shown. The flow diagram shown in FIG. 2 commences with the step shown Box 10, namely, "Install Imaging Application on Mobile Device Camera." The user commences with step shown in Box 12 where the user activates the imaging app and a touchscreen is disposed on the viewfinder window. Box 12 has the statement "Pre-Loaded, Changeable Transparent Image-Supporting Surface Overlays Superimposed with Transparent Camera Images." The user has the option by finger manipulation to perform a zoom function on the camera image and to focus the image by tapping the touchscreen at a point of reference on the touchscreen.

Once the user has made a preliminary decision with respect to the camera image, the user can activate an image-capture icon, such as a button on the touchscreen, to bring an editing touchscreen indicated in Box 14 on the viewfinder window. This is one of several options that the user has. Upon the display of the editing touchscreen on the viewfinder window, there appears a high-fidelity, non-transparent, watermarked image of the image-supporting surface located on editing the touchscreen. The user can both swipe the various image-supporting surfaces available on the editing touchscreen (which are the same as those in the imaging touchscreen referred to in Box 12). The user can also manipulate the image by finger manipulation to either move the camera image to different positions on the image-supporting surface (i.e., by dragging to a position on the image-supporting surface the image by moving the user's finger along the touchscreen while being opposite the image) or by rotating the camera image. The user can also zoom in on the subject by using two fingers to basically pull apart the image or to zoom out by using the two fingers to pull together the image on the image-supporting screen. Furthermore, as just noted the user can use two fingers to rotate, i.e. or orient, the image on the image-supporting surface. Under the preferred form of the invention, the user can also select any of a variety of image filters by simply tapping the variety of image-filter overlays to apply the particular overlay to the selected image on the image-supporting surface.

The user has the option of pressing an appropriate icon to "Complete Printing of Finally-Selected Image" on the finally-selected "Image-Supporting Surface" as shown in Box 16, or the user can either share the image superimposed on the product overlay (as described below), or save the finally-selected image by hitting a "Save" icon indicated in Box 30 to create a high-fidelity mock-up image of the image-supporting surface with the finally-selected image, as edited, located on the image-supporting surface. The image is stored in the photo-storage section of the mobile device. The user has the option of not processing a captured image which was transferred to editable touchscreen 14 but rather select a different option by touching an icon in the image touchscreen indicated with reference to Box 12 and entering a new touchscreen indicated in Box 18 labeled "Stored Images." The touchscreen indicated in Box 12 can effect the showing of "All Stored Images" on the mobile device indicated by the Box 20, or entering another touchscreen indicated by Box 22 labeled "Chronologically Stored Images." if the user selects the step of Box 20, the user touches an icon showing a touchscreen with all of the images stored in the mobile device and follows the step shown in Box 24 labeled "Select One Stored Image" where the user touches a selected stored image for further processing. Similarly, if the user selects the step shown in Box 22, the user is presented with another touchscreen showing the images stored over a predetermined period of time and can select one of those image following the step in Box 26 labeled "Select One Chronologically Stored Image." The selected "One Stored Image" or the selected "Chronologically Stored Image" is fed to the steps in Box 14 to be processed just as was the camera image that would have been selected by the user.

The user has another option of using an icon presented in the touchscreen shown on the viewfinder window with respect to step in Box 12, in which the user can have displayed on the camera viewfinder a "Catalog of Image-Supporting Surfaces," indicated bye Box 28, where the user can select any of the available image-supporting surfaces as an alternative to using the swipe function available pursuant to the step indicated in Box 12.

Another option available to the user under an embodiment of the present invention is to tap an appropriate icon and direct the output from Box 12 to a viewable Unique Newsfeed shown in Box 27.

After the user has completed the step indicated in Box 14, the user has the option of saving the selected image-supporting surface indicated by the Box 30. Following the step of Box 30, the user can either complete the printing process as shown in Box 16, can discard the saved image as shown by Box 32, or transmit the saved image as indicated in Share Box 36, or go back to the steps shown in Box 14. The user also has the option of sharing the image prepared upon exit from the steps in Box 14 by touching an appropriate icon to enter a "share" function by selecting Box 36 marked "Share," where the user is presented with another touchscreen where the user can use the message step shown by Box 38, share to social media indicated in Box 39, post a unique newsfeed indicated in Box 49 marked Unique Newsfeed, or send the selected image on the selected image-supporting surface by using the step in Box 48 entitled "Email." The user can transmit the transparent image overlay with the newsfeed image superimposed thereon from Box 49 to either editing aspect shown in Box 14, or transmit it directly to the complete printing apparatus indicated in Box 16.

Figure 3:
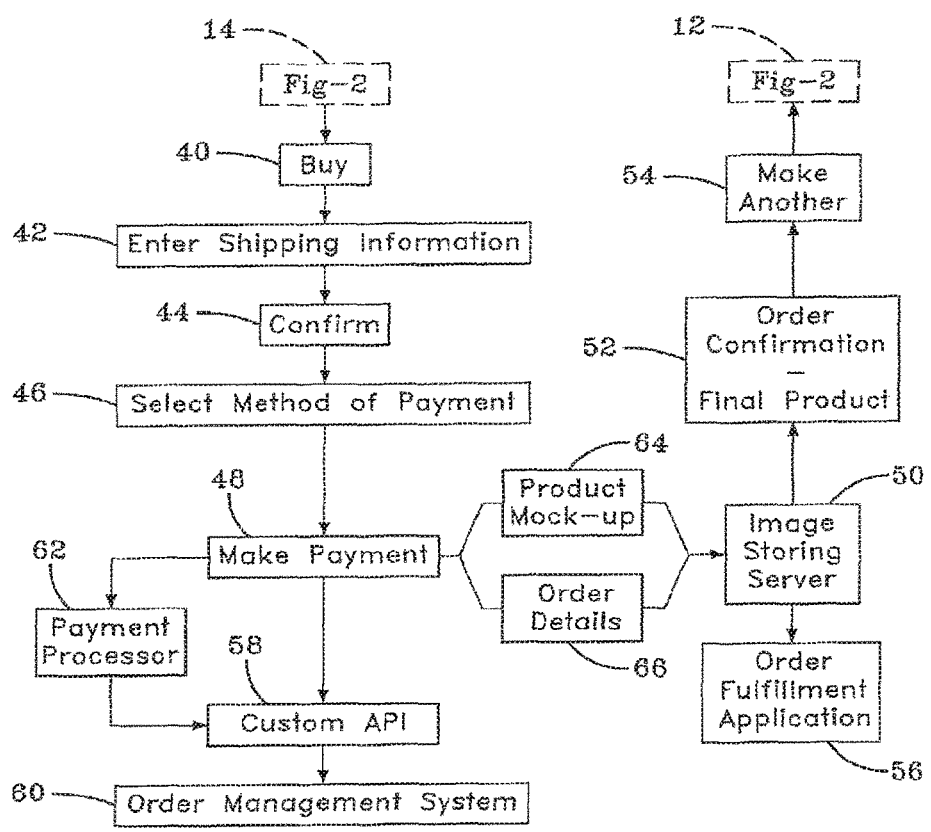
FIG. 3 is a flow diagram showing additional steps in a preferred embodiment of the invention.

FIG. 3 shows an example of the process for completing the printing of a finally-selected image on a finally-selected product with an image-supporting surface indicated generally by Box 16 in FIG. 2. In the example shown, the user will use the imaging app loaded onto the mobile device camera as indicated by Box 10 in FIG. 2. Referring to FIG. 3, the user touches a BUY icon indicated by the Box 40, and a touchscreen appears on the viewfinder window for entry of shipping information. This step is indicated by Box 42. The user enters the user's name, shipping address, size and number of image-supporting surfaces and confirms this information by tapping an icon indicated by Box 44. However, if the user has already entered in shipping information, this will be saved and the user can simply scroll to the bottom and hit "confirm." When the confirmed indication is made, a new touchscreen appears in the viewfinder window, and the user enters the type of payment following the step in Box 46 marked "Select Method of Payment." A screen appears, referred to as the "payment" touchscreen, and the step is indicated by Box 48 and entitled "Make Payment." Under the preferred embodiment, the user has the option of using a new credit card, saved credit card, or an alternate payment method, such as PayPal. Once the "Make Payment" step is completed, two image files are seat to an image storage-server indicated in Box 50. One image file is the raw image the user generated when the user took the picture, with applied filters in a Box 66, labeled "Order Details." The second image is the representation of the product with the image-supporting surface superimposed thereon as the product mock-up, which includes any filters or adjustments made by the user in a Box 64 marked "Product Mock-up."

After image storaging-server indicated in Box 50 has completed its process and has transmitted an output represented by Box 52, entitled "Order Confirmation/Final Product," which appears on another screen shown on the mobile device viewfinder window, the user can begin the process anew. The user would enter the step indicated by Box 54, entitled "Make Another," which goes back to the initial Box 12.

The image storage-server transmits the finally selected images for the physical order fulfillment by means of an "Order Fulfillment" app indicated by the box marked 56.

Thus, the order information, including the user's name, specific image-supporting surface (i.e., product), the size of the product and contact information, are sent from the image-supporting surface from image storage-server 50 to "Order Fulfillment" app shown in Box 56.

Details of the order are transferred to a custom protocol or interface, or custom program interface, shown in Box 58 marked "Custom API." The "Custom API" 58 transmits payment to the "Order Management System" marked on Box 60. "Custom API" 58 may require pre-authorization to ensure that a user has necessary funds before running the transaction through "Custom API" indicated in Box 58, and a "Payment Processor" shown in Box 62 would indicate that the user does have the necessary funds in order that the transaction could be completed.

User account details, including device IDs for push notifications, are passed from the mobile device camera through "Custom API" indicated in Box 58 to an appropriate stand-alone database. The customer is emailed order confirmation automatically from a preselected API ("application program interface" or "application protocol interface") with a picture of the mock-up image of the item they purchased and order details.

Figure 4A:
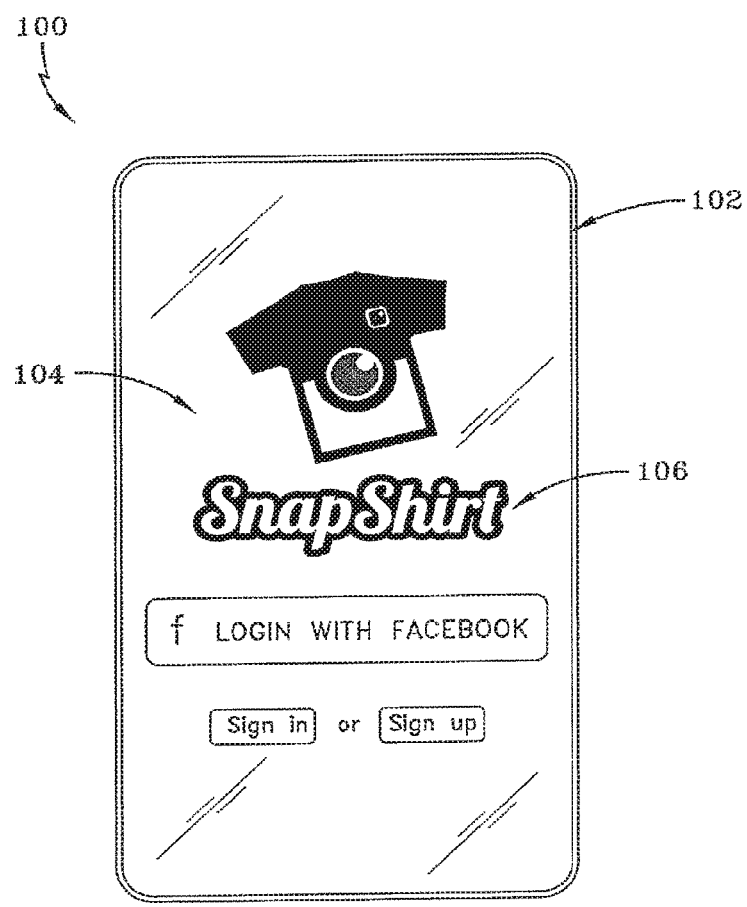
FIGS. 4A-4U are schematic views of the system and steps showing a preferred embodiment of the invention.

The following discussion relates specifically to the preferred embodiment of the invention which is now in use. Referring first to FIG. 4A, a mobile device 100 is shown having a camera viewfinder 102. Camera viewfinder 102 has a viewfinder window 104. The invention involves an application, or "app," described below which is installed on mobile device 100. The app has a login touchscreen 106 for actuating the app.

Figure 4B:
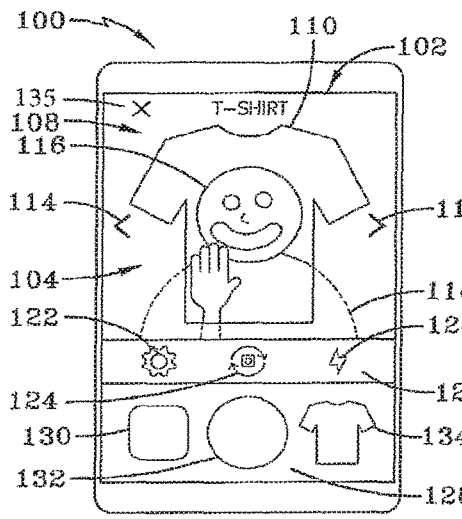

The user of mobile device 100 enters the login by either signing in by pressing the "Sign In" icon, the "Sign Up" icon or enter using an appropriate communications device, such as Facebook®. The user would agree with the various terms of service to be provided. Upon logging in, a "Photo Capture" touchscreen 108 is displayed on viewfinder window 104, as shown in FIG. 4B. "Photo Capture" touchscreen 108 shows one of a series of transparent product overlays with a product 110, which is shown as a T-shirt. "Photo Capture" touchscreen 108 has a pair of product arrow icons 112 and 114 that can be touched to display sequentially the other products in the series of products stored in the camera viewfinder 102. A camera image 116 is superimposed on transparent product image 110 and extends beyond the latter, as shown by the dotted lines 118 extending beyond product 110. Camera image 116 is continuously variable as either the subject moves or the camera viewfinder 102 moves. There is also a second touchscreen 120 located below touchscreen 108 having a "Settings" icon 122, a flash icon 126 indicating that a flash will go off if a picture is taken, a camera facing icons 124, and a "Product Review" icon 134. Icon 122 can be touched or tapped so that the user can change the settings of mobile device 100. Icon 124 can be tapped to reverse the field of view so that the subject being viewed by the camera is reversed, and generally the subject of the camera image is the user. A third touch screen 128 is also displayed on camera viewfinder window 104. A stored photo icon 130 is shown in touchscreen 128. Icon 130 can be tapped to reveal additional icons. One icon shows photos taken over a chronological period. The user can simply tap any of these icons and they would appear on product 110 in opaque form. Another icon revealed upon the tapping of icon 130 is a storage album of all of the photos stored in camera viewfinder 102. The user can tap any of those stored photos to have them placed on the currently-displayed product in touchscreen 108. The images appearing by touching either of the last icons can have their size changed by the user using a pair of fingers to zoom or zoom out the image. The user also has the option of not tapping icon 130 or the icons made viewable on the tapping of icon 130. Camera-actuating icon 132 can be tapped to take a picture. Depending on the mobile device camera, when icon 132 is actuated, a picture is taken and a flash goes off under low light conditions. When the user takes a picture, the original image is stored to the user's camera roll. The user can go back to FIG. 4B-4E, or return to the previous screen, by tapping on the "x" (close button) viewable on touchscreen 108 after a picture is taken. The touchscreen shown in FIG. 4F thereafter appears. The user can also tap a "share" icon 133 shown as a box with an arrow, to share with other social media or save the mock-up of the photo. The saved photo will be stored in the chronologically-stored pictures and in all of the stored pictures which are viewable upon depressing icon 130, and the icons for either "Chronologically Stored Images" or "All Stored Images." Tapping "share" icon 150, and proceeding through an interim touchscreen, gives the user the option of sharing a created image to a newsfeed touchscreen 300 shown in FIG. 4O described below. An icon X 135 can be tapped to display the last screen on the viewfinder window 104.

Figure 4C:
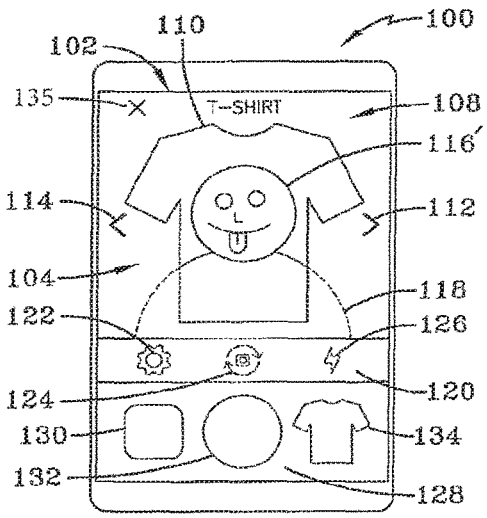
Figure 4D:
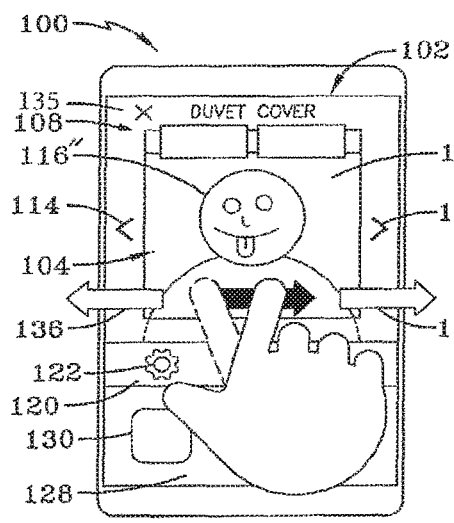

As mentioned above, the camera images are changeable upon the constant movement or changing of the camera image, and this is shown in FIG. 4C, where the camera image 116 has changed, as shown by camera image 116'. The other components of FIG. 4C are identical to those in FIG. 4B, and most of the identification numbers have been omitted. It was also mentioned above that the size and orientation of the image shown on transparent product overlay 110 can be made larger or smaller, and the orientation of the image can be changed, as viewed on image touchscreen 108. This is shown in FIG. 4G whereby figure manipulation the size of the subject can be changed. The view of the subject 116' in FIG. 4G is shown as being increased in size from the figure shown in FIGS. 4B and 4C. The change in size is also shown by a pair of fingers in FIG. 4G. Whereas the product shown in FIGS. 4B and 4C are T-shirts, by actuating one of icons 112 and 114 the product can be changed. In addition, the arrows 136 in FIG. 4E, indicate swiping and changing the product image overlay. The product shown in FIG. 4D is a duvet cover, which is not only shown with the camera image 116 changed to 116', but that the transparent product overlay 110 has been changed to camera image 116" on the duvet cover 110'.

Figure 4E:
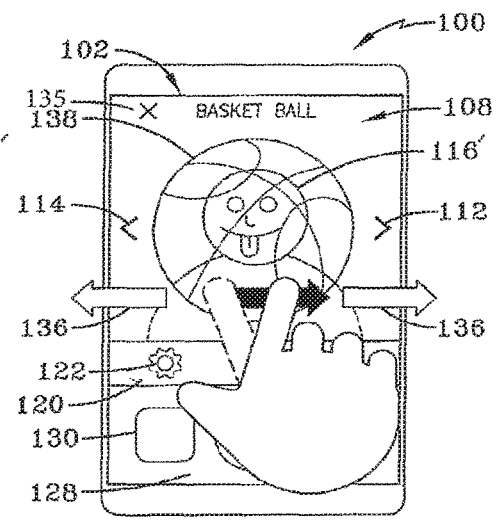
Figures 4F, 4G:
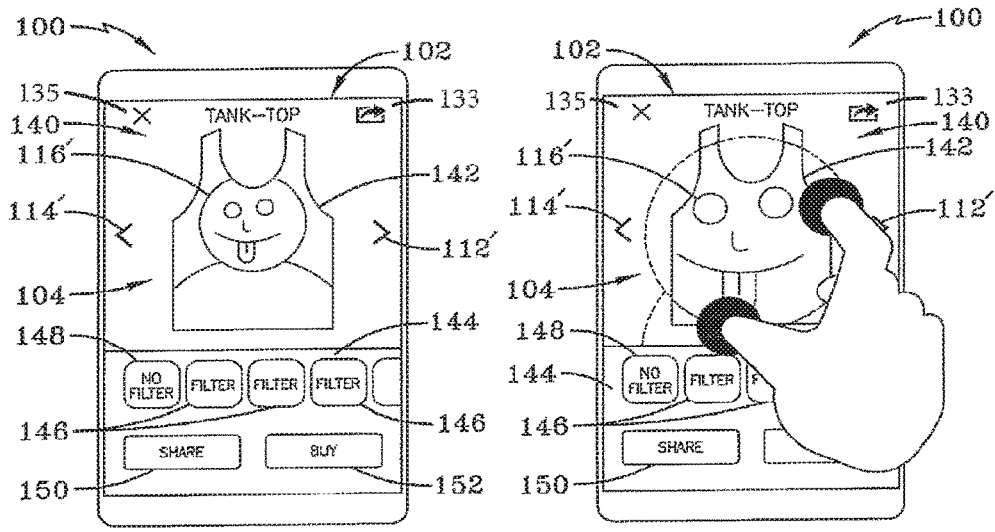

FIG. 4E shows as the product one with a curved surface, not a flat surface. Product 138 is a basketball as shown by the words above product 138.

Figures 4H, 4I:
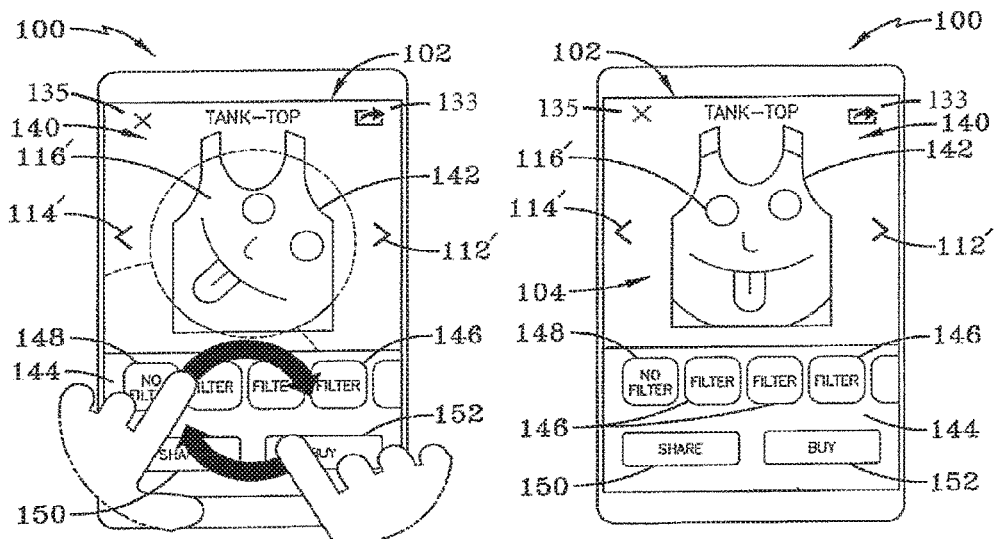

Once the user has preliminarily selected a product 110 and one of the camera images or a saved image for the possible printing on a product, the user either laps a saved image, which was found by pressing icon 130, or takes a picture by tapping icon 132. When one of the latter icons is tapped, an editing touchscreen 140 is displayed on viewfinder window 102 as shown in FIG. 4E. As shown in FIG. 4F, the user is still able to touch an icon 112' or 114' or swipe to change the product displayed on editing touchscreen 140. A tank top 142 is shown displayed on touchscreen 140. The image 116' is superimposed on product 142, but image 116' is opaque and is confined to the product. Furthermore, as shown in FIG. 4G, the user can change the size and orientation of image 116' on product 142 by figure manipulation. In other words, the user can drag the image and zoom in and zoom out the image. Furthermore, as shown in FIG. 4H, the user is able to change the orientation or rotate the image by finger manipulation as shown. A rotated image on product 142 is shown in FIG. 4H.

Viewing each of FIGS. 4F-4H, a touchscreen 144 is shown below touchscreen 140. Touchscreen 144 has a series of filter icons 146 and a non-filter icon 148. The user can tap anyone of these icons to use the respective filters. Filters 146 can use such filters as black and white, bronze, boost, retro, antique, frosty and blur. Another icon 150 is shown marked "SHARE." By tapping the "SHARE" icon 150, the user has the option of sending the mock-up of image 116' on product 142 by email, text message, or share to social media.

Figure 4J:
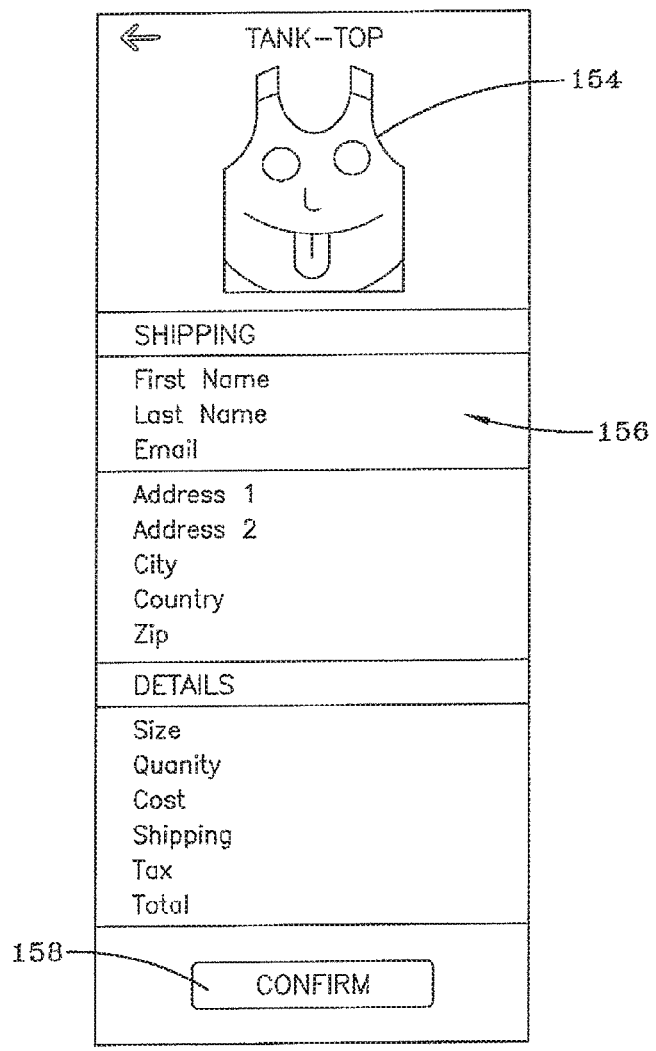
Figure 4K:
Figure 4L:
Figure 4M:
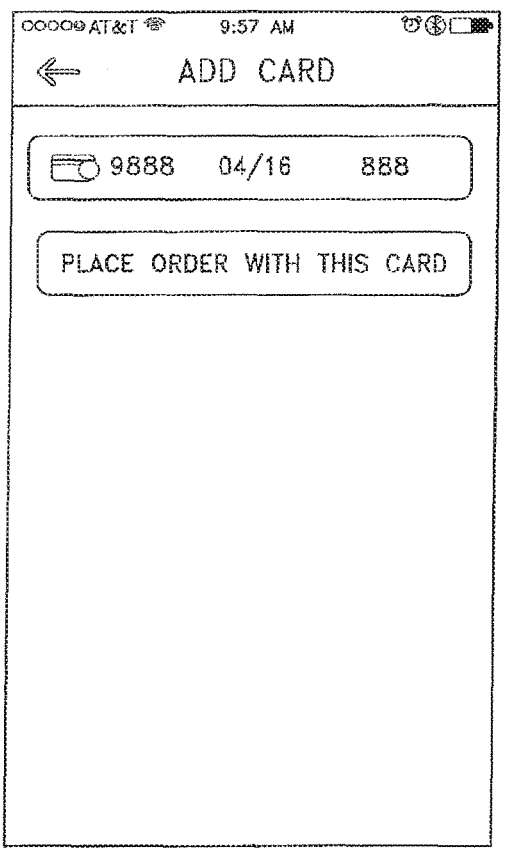
Figure 4N:
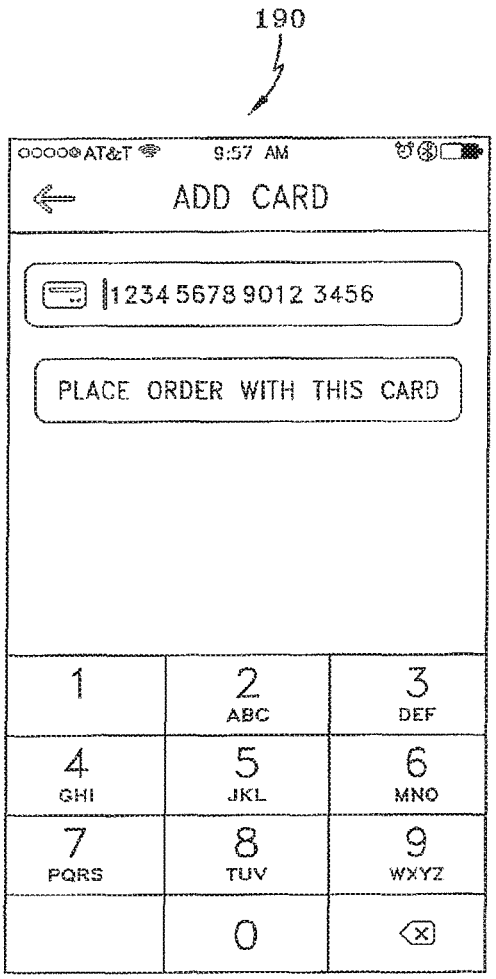
Figure 4O:
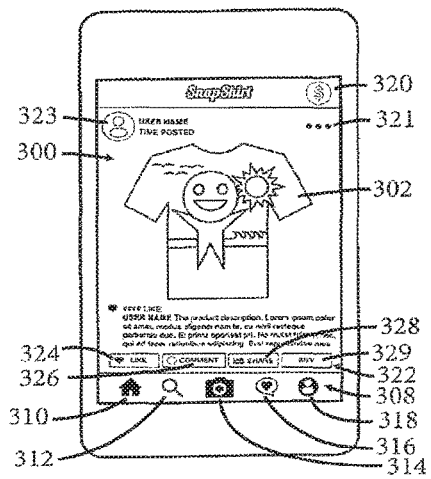
Figure 4P:
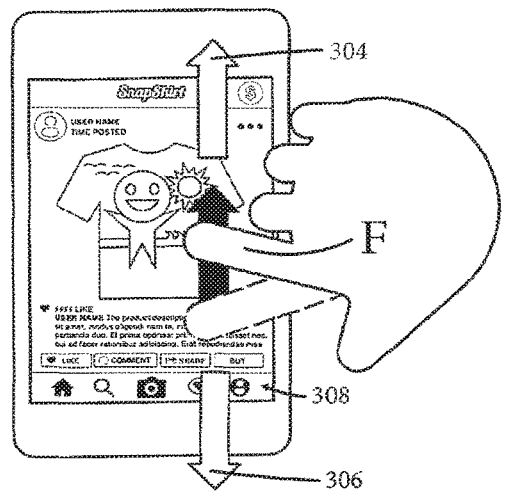
Figure 4Q:
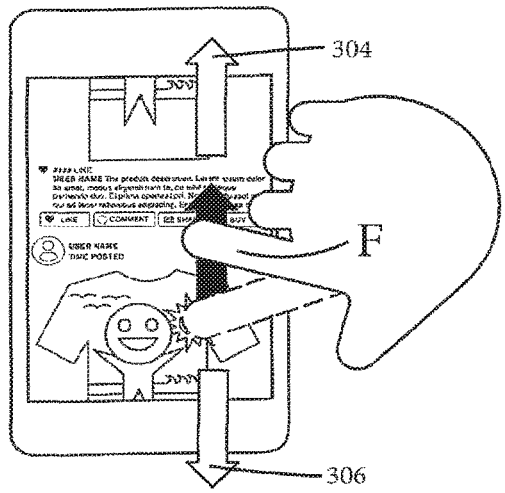

As referred to above, the user could also tap the share icon 133, and following some possible interim touchscreens, the newsfeed touchscreen 300 would appear on viewfinder shown in FIG. 4O. The user has the option of seeing other products in newsfeed by scrolling as shown in FIGS. 4P and 4Q. The user can scroll by finger touch using the user's finger F to move the image as indicated by the arrows 304 and 306. There is another touchscreen 308 having several icons. An icon 310 is a home icon. An icon 312 is a search to search for another user's profile or other products on the newsfeed or other categories of products. An icon 314 is used to access Photo Capture screen 108. There is an icon 316 which is causes an activity screen showing messages from other users regarding their activities, their comments regarding the user's input to the newsfeed, etc. An icon 318 causes the display of the profile touchscreen. An account balance or earnings icon 320 shows the amount the user made by others buying products with the user's created designs. Another icon 321 can be tapped so that the user can report on the newsfeed or elsewhere inappropriate contents such as inappropriate designs. An icon 323 is a profile icon, which, when tapped, displays the user's profile on the viewfinder window 194.

Another touchscreen 322 has additional icons. An icon 324 labelled "LIKE"? indicates that the user liked a design shown on touchscreen 300. Another icon 326 labelled "COMMENT" is where user could comment on a design shown on touchscreen 300 to be viewed by any followers of the user. A buy icon 329 can be tapped to initiate the buying process.

Figure 4R:
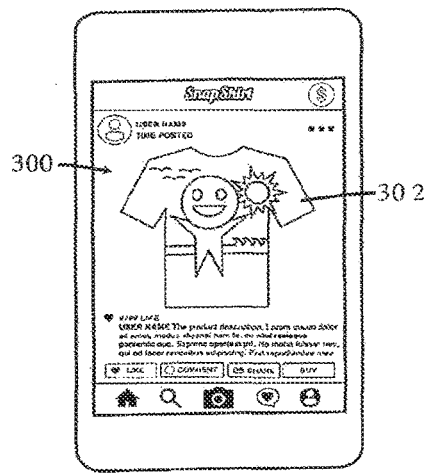
Figure 4S:
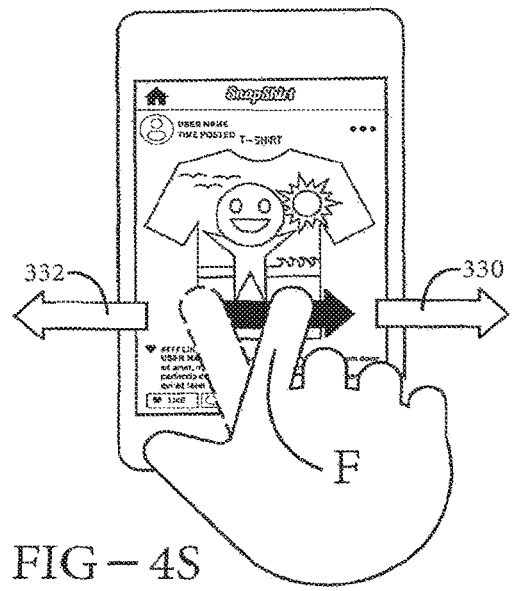
Figure 4T:
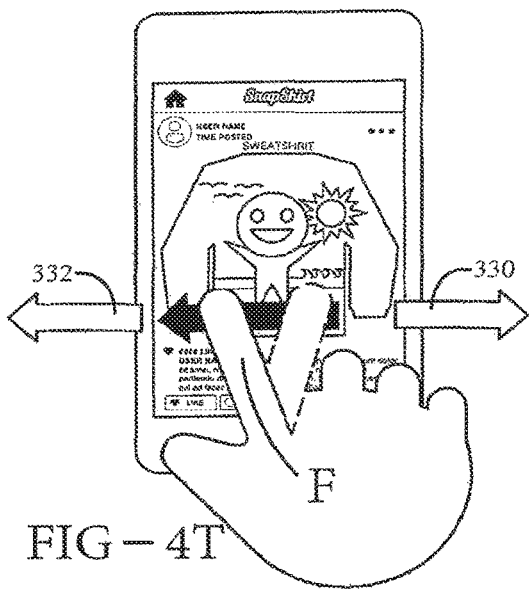
Figure 4U:
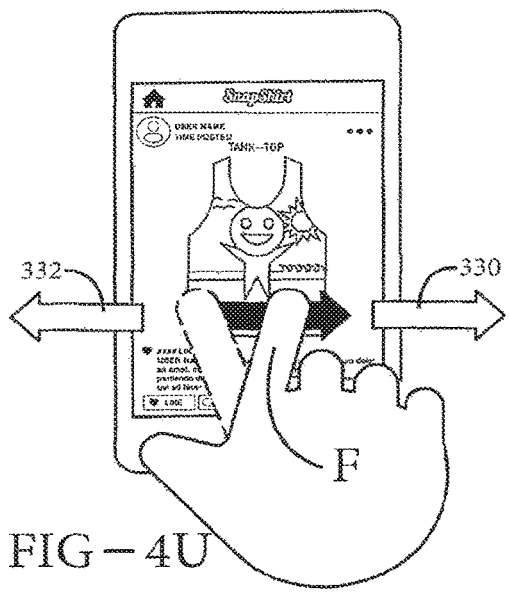

An important aspect of a preferred form of the invention is shown in FIGS. 4R-4U. FIG. 4R shows the touchscreen of FIG. 4O. FIGS. 4S-4U indicate that the user can change product overlays on newsfeed with the same created image. Thus, in FIG. 4S, the user can use finger F to change the product on which the creative design is shown in image form. Thus, in FIG. 4S, product 302 is shown as a t-shirt. The user can by finger touch using finger F and moving as indicated by arrows 330 and 332 other products such as a tank-top 334 and a sweatshirt 336.

Referring to FIGS. 4F-4I, there is also an icon 152 labeled "BUY." When icon 152 (as well as buy icon 329) is tapped, a real-time mock-up appears on a "CHECKOUT" screen 154 shown in FIG. 4J. FIG. 4J includes all of the indicia required for the user to purchase a real item configured exactly like real-time mock-up 154, "CHECKOUT" screen 156 will require such information as the shipping information, the product size, the quantity required and the costs and totals. Thereafter, the user would press a "CONFIRM" icon 158 and a payment screen appears on viewfinder window 102.

Another alternative "CHECKOUT" screen 160 is shown in FIG. 4K. Screen 160 is similar to screen 156 but has more details. An email address has been entered. The details regarding the size have been changed from that of screen 156, and further information is also set forth.

FIG. 4N shows a type of payment screen 190. In FIG. 4N, payment can be by PayPal, Credit Card, or any other systems such as Apple Pay, BitCoin, etc. The appropriate icon is tapped. If the credit card icon is tapped the screen shown in FIG. 4L appears on viewfinder window 104, and the user enters the appropriate information, and the screen is adjusted to screen 180 as shown in FIG. 4M. Other payment screens would be employed if an alternative payment system is used such as PayPal.

Figure 5A:
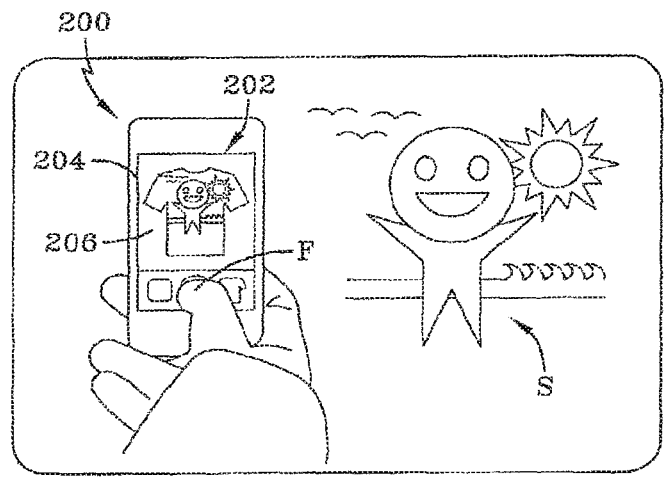
FIGS. 5A-5J are schematic views of a mobile device window showing the implementation of a preferred form of the invention.
Figure 5B:
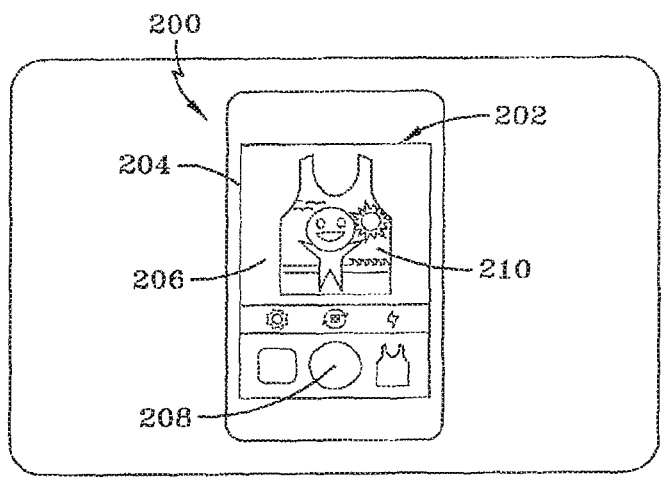
Figure 5C:
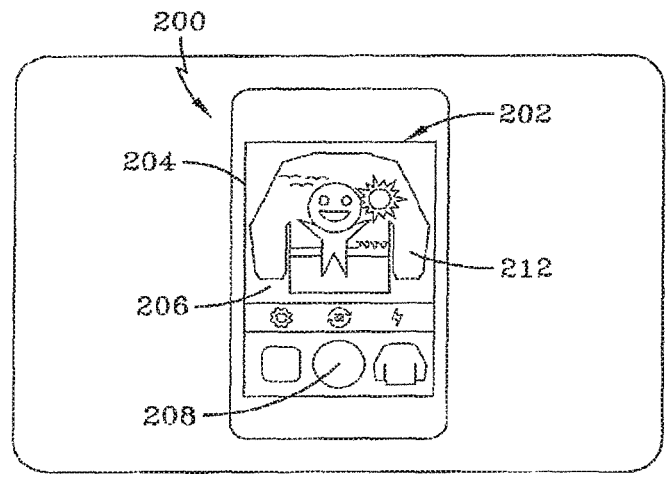
Figure 5D:
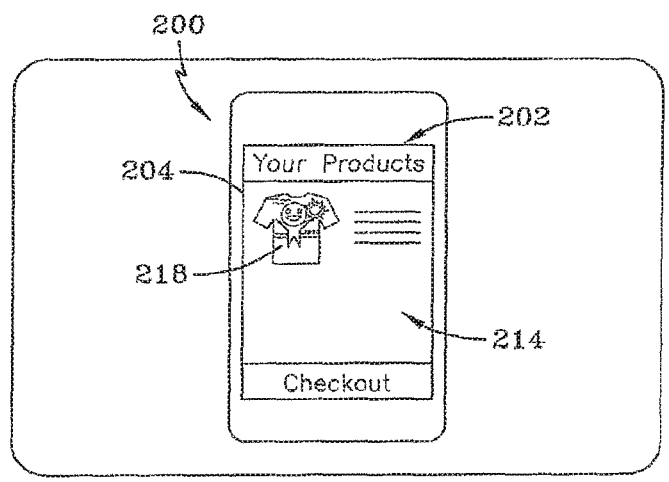
Figure 5E:
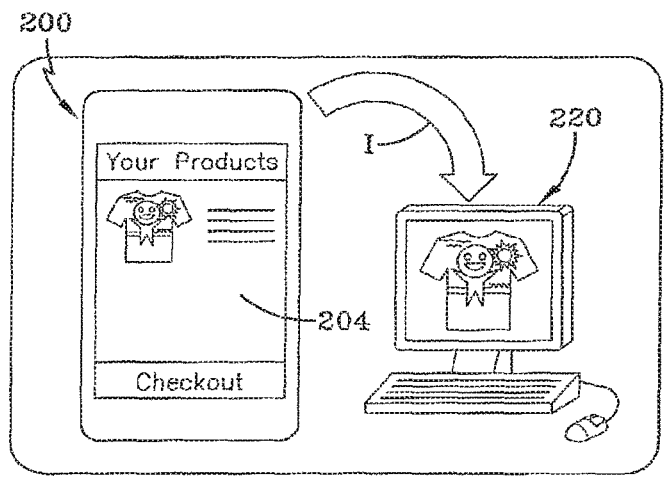
Figure 5F:
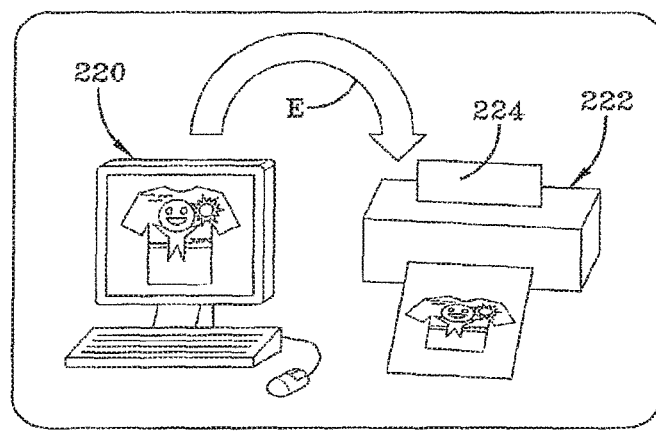

A further description of the preferred embodiment of the present invention is shown in FIGS. 5A-5J. FIG. 5A shows a mobile device camera 200 having a viewfinder 202 with a viewfinder window 204. A subject S is shown, and a camera image 206 of subject S is displayed on viewfinder window 204. FIG. 5A further shows a user's finger F and a picture-taking icon 208, which is in effect a shutter release. Upon the actuation of icon 208, the viewfinder window 204 displays the camera image 206 of which a picture was taken, i.e., a photo was made, disposed on a transparent overlay of a tank top 210. By tapping an appropriate icon as discussed previously, or swiping, a different product is shown, and FIG. 5C shows a sweatshirt 212 on which subject 206 continues to be displayed in viewfinder window 204 of mobile device camera 202. Upon the tapping of a "BUY" icon referred to above, a "CHECKOUT" screen 214 appears in window 204 of mobile device camera 202. "CHECKOUT" screen 214 requires the user to insert the various information required, as discussed previously and if not already saved, and shows a real-time mock-up 218 of the product selected with the camera image superimposed thereon, which is exactly what the final product would look like. Upon the further processing of the information required on the viewfinder window 204, the user completes the process and the various information is transferred over the Internet to a proper computer control 220 shown in FIG. 5E. FIG. 5E shows the information from mobile device 200 being transmitted as electronic signals to computer control 220 by means of the Internet, indicated by the symbol I. Referring to FIG. 5F, computer control 220 electronically transmits the required information, shown schematically by the letter E, to preferably a dye sublimation printer 222. Sublimation printer 222 prints a camera image 216 on an appropriate format 224 (shown in FIG. 5G), which, for example, could be an appropriate heat-transfer paper, or in some cases, directly onto fabric.

Figure 5G:
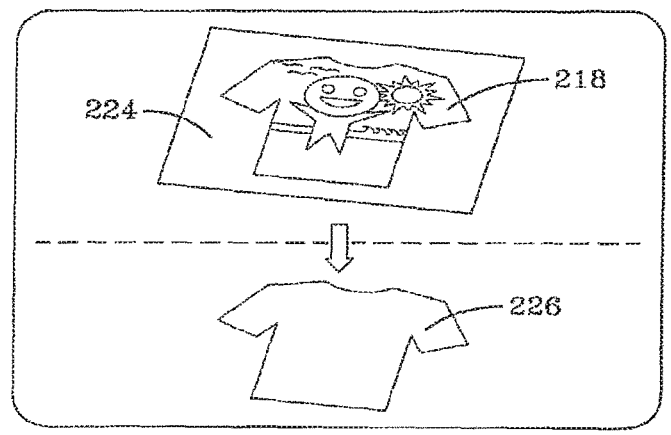
Figure 5H:
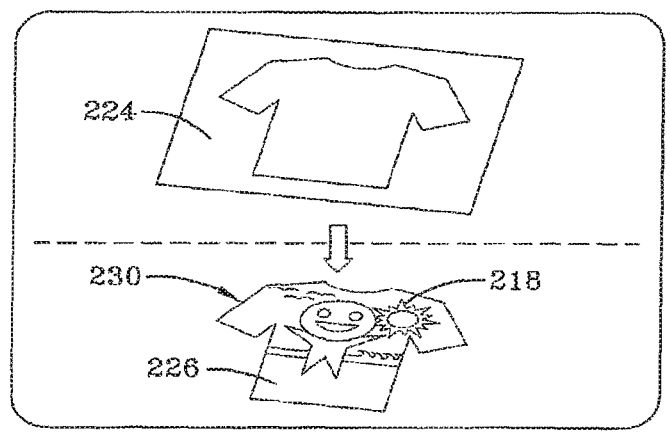
Figure 5I:
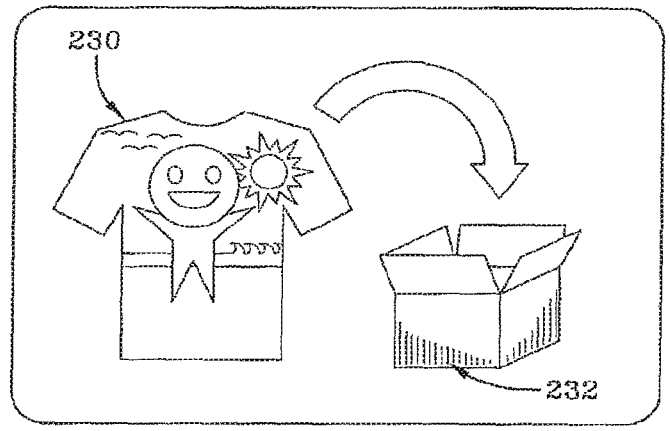
Figure 5J:
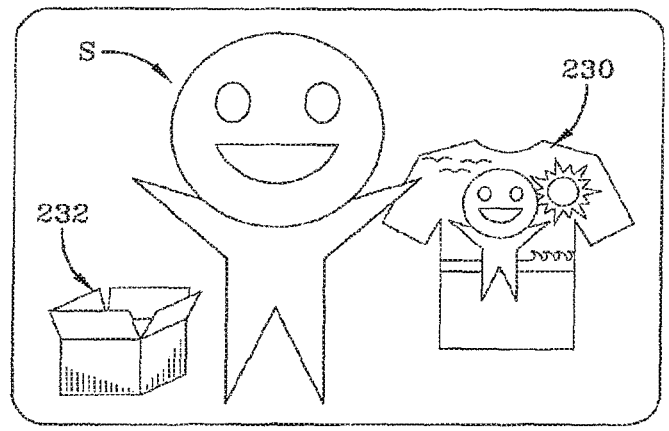

Turning next to FIG. 5G, printable format 224 is schematically shown as being in position for printing camera image 218 on a product 226 shown as a T-shirt. The dye sublimation printing process is completed as shown in FIG. 5H, and the printing format is shown as having printed image 218 on product 226. It can be seen that a final product 230 is exactly the same as the mock-up 218 shown in FIG. 5D, FIG. 5I shows finished product 230 being disposed in a package 232 for shipping to the customer. FIG. 5J shows the customer C having received finished product 230 in package 232. Although the foregoing drawings are relatively simple, this should indicate the large variety of applications available to the present invention. One has the ability to take a picture and turn, it into a product, such as clothing, household products, and the like, using not only the transmitting processes as described above but also on such social media as Instagram, Twitter or Facebook, where a user can sign up, use stored or take pictures (i.e. photos), and then use the app to make mock-ups of the final product. The invention could be used not only for the items discussed above but also for such a variety of items as dishware, decorating many sorts of products having image-supporting surfaces, such as motor vehicles, furniture, industrial property, acid the like. According to a preferred form of the invention, a user can share their products to an interactive unique newsfeed in which other users having the unique newsfeed can share or purchase the viewable product. The unique newsfeed will be similar to a traditional newsfeed such as Instagram®, however, the unique newsfeed will allow the users with the unique newsfeed to purchase or share the viewable products with a selected subject thereon and also, swipe to view additional product variants of the user's creations, and use any selected contents thereof for printing on an image-supporting surface, which can, for example, be used for purchasing products with the image supporting surface (such as garments, flexible goods, hard goods, etc.) The images produced on final products have great clarity and can have very vibrant images, far better than those presently on the market. Camera images can be made on mobile device cameras without any geographical restriction, and can be made and ordered as imprinted. The mock-ups can be transferred almost immediately and ordered on a product in less than 15 seconds for others to share. Moreover, the final products are very economical and find a tremendous variety of uses.

The invention has been described in detail with particular emphasis on the preferred embodiments thereof, but variations and modifications within the spirit and scope of the invention may occur to those skilled in the art to which it pertains.

I claim:

1. A print of an image on a product, the product having an image-supporting surface made with the use of a mobile device camera for viewing subjects, the mobile device camera being actuable for taking a picture of a subject, the mobile device camera comprising a viewfinder with a viewfinder window for displaying images of subjects viewed by the mobile device camera, the mobile device camera including an imaging app comprising a finger actuable displaying touchscreen and a finger actuable editing touchscreen;

the finger actuable displaying touchscreen enabling the simultaneous display on the viewfinder window of at least one of a series of image-supporting surface transparencies of products having image-supporting surfaces and of images of subjects viewed by the mobile device, for enabling the choosing by finger touch of a specific transparency of an image-supporting surface and transparent images of subjects viewed by the mobile device, the finger actuable displaying touchscreen being finger actuable to present the finger-actuable editing touchscreen on the viewfinder window; and the finger actuable editing touchscreen enabling the user's fingers to move a selected image of a subject on the image-supporting surface transparency to make mock-ups of the respective images of the subjects on the products having the image-supporting surface transparency and enabling by finger manipulation on the finger actuable editing touchscreen changing of the size and location of a selected image of a subject on the product having the image-supporting surface transparency on the finger actuable editing touchscreen to make sequential mock-ups of respective images of the subjects in real time;

the finger actuable editing touchscreen being finger-actuable to capture a transparency of a selected image on the changeable image-supporting transparency on the touchscreen to prepare a mock-up in real time of the finally selected product having the image-supporting surface with a finally selected captured image of the subject in preparation for the printing of the finally selected captured image on the finally selected product having the image-supporting surface.

2. A print of an image on a product having an image-supporting surface with the use of a mobile device camera according to claim 1 wherein the finger actuable displaying touchscreen further includes a photo memory access which the user can actuate by finger touch on a respective previously stored photo to present to the finger writable editing touchscreen on the viewfinder window the previously stored photo on the image-supporting surface previously shown in said finger actuable displaying touchscreen, the size and location of the previously stored photo on the image-supporting surface being variable by finger manipulation of the user.

3. A print of an image on an image-supporting surface according to claim 1 wherein the finger actuable editing touchscreen further includes at least one filter actuable by finger touch to apply a filter overlay to the selected image displayed on the image-supporting surface on the editing touchscreen.

4. A print of an image on an image-supporting surface according to claim 3 wherein:
the filter is selected from the group consisting of a color tint, an automatic tint;
the selected image is changed to a black and white image, an increased color contrast image, a frosty tint and a blurry image.

5. A print of an image on an image-supporting surface according to claim 2 wherein the finger actuable editing touchscreen further includes at least one filter actuable by finger touch to apply a filter overlay to the previously stored photo displayed on the product having an image-supporting surface on the editing touchscreen.

6. A print of an image on an image-supporting surface with the use of a mobile device camera according to claim 1 and wherein the imaging app further comprises a final selection touchscreen actuable by finger touch for the user to make a final selection of a mock-up of a selected image on a selected product having an image-supporting surface.

7. A print of an image on an image-supporting surface for use with a mobile device according to claim 2 and wherein the imaging app further comprises a final selection touchscreen actuable by finger touch for the user to make a final selection of selected one of a mock-up of a selected image on an image-supporting surface and a mock-up of a selected preciously stored photo on a selected image-supporting surface.

8. A print of an image on an image on a product having an image-supporting surface for use with a mobile device according to claim 1 wherein said imaging app further comprises a finger actuable newsfeed touchscreen enabling the simultaneous display on the viewfinder window of at least one of a series of changeable image-supporting surface transparencies and superimposed transparent newsfeed camera images, for enabling by finger the choosing by finger touch of a selected specific image-supporting surface and a transparent newsfeed image superimposed thereon, the finger-actuable newsfeed touchscreen being finger actuable to present the selected image supporting surface with the superimposed newsfeed camera image from the finger actuable newsfeed touchscreen on the editing touchscreen.

9. A viewable printed image created by a method using a mobile device camera, the mobile device camera comprising a viewfinder with viewfinder window for displaying images of subjects viewed by the mobile device camera, and an imaging app comprising a finger actuable displaying touchscreen and a finger actuable editing touchscreen, for both (a) displaying both camera images and ones of a series of transparencies of images and image-supporting surfaces in a superimposed relationship, and (b) a finger actuable editing touchscreen for displaying editable camera images on the editing touchscreen, the mobile device camera being actuable for taking a picture of a subject, the method comprising:
actuating the mobile device camera;
actuating the imaging app to effect the display of the displaying touchscreen on the viewfinder window;
choosing by finger touch one of the series of specific transparencies of image-supporting surfaces and one of the transparent camera images of subjects viewed by the mobile device camera, presenting the finger actuable editing touchscreen on the viewfinder window; and
moving by finger actuation a selected image of a subject on the image-supporting surface transparency on the finger actuable editing touchscreen to make mock-ups of the respective images of the subjects on the image-supporting surface transparency and selectively changing by finger actuable editing the size and location of a selected camera image of a subject on the image-supporting surface transparency on the finger actuable editing touchscreen to make sequential mock-ups of respective images of the subjects in real time, to capture a transparency of a selected image on the changeable image-supporting transparency on the finger actuable editing touchscreen to prepare a mock-up in real time of the finally selected image-supporting surface with a finally selected captured image of the subject in preparation for the printing of the finally selected captured viable image on the finally selected image-supporting surface.

* * * * *